United States Patent
Kim et al.

(10) Patent No.: US 11,223,375 B2
(45) Date of Patent: Jan. 11, 2022

(54) ELECTRONIC DEVICE AND ANTENNA CONTROL METHOD OF ELECTRONIC DEVICE

(71) Applicant: Samsung Electronics Co., Ltd., Gyeonggi-do (KR)

(72) Inventors: Jungjoon Kim, Gyeonggi-do (KR); Jiyong Kim, Gyeonggi-do (KR); Jihoon Kim, Gyeonggi-do (KR); Hyoseok Na, Gyeonggi (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/765,813

(22) PCT Filed: Nov. 23, 2018

(86) PCT No.: PCT/KR2018/014541
§ 371 (c)(1),
(2) Date: May 20, 2020

(87) PCT Pub. No.: WO2019/103532
PCT Pub. Date: May 31, 2019

(65) Prior Publication Data
US 2021/0159926 A1 May 27, 2021

(51) Int. Cl.
*H04B 1/00* (2006.01)
*H01Q 1/24* (2006.01)
*H04B 1/401* (2015.01)

(52) U.S. Cl.
CPC ........... *H04B 1/0064* (2013.01); *H01Q 1/243* (2013.01); *H04B 1/0057* (2013.01); *H04B 1/401* (2013.01)

(58) Field of Classification Search
CPC .... H04B 1/0064; H04B 1/0057; H04B 1/401; H01Q 1/243
See application file for complete search history.

(56) References Cited

U.S. PATENT DOCUMENTS

| 2014/0185498 A1 | 7/2014 | Schwent et al. |
| 2017/0026136 A1 | 1/2017 | Thompson et al. |

(Continued)

FOREIGN PATENT DOCUMENTS

| CN | 105207709 | 12/2015 |
| KR | 1020130028572 | 3/2013 |

(Continued)

OTHER PUBLICATIONS

European Search Report dated Oct. 12, 2020 issued in counterpart application No. 18881268.9-1220, 46 pages.

(Continued)

*Primary Examiner* — Nguyen T Vo
(74) *Attorney, Agent, or Firm* — The Farrell Law Firm, P.C.

(57) ABSTRACT

An electronic device can comprise: a processor; a transceiver connected to the processor; a first front-end unit connected to the transceiver and performing transmission/reception at an LTE low-band frequency; a second front-end unit connected to the transceiver and performing transmission/reception at an LTE middle-band frequency and/or an LTE high-band frequency; a third front-end unit connected to the transceiver and performing transmission/reception at a 5G-band frequency; a diplexer unit connected to the first front-end unit and the second front-end unit; a filter unit connected to the third front-end unit; a first antenna connected to the diplexer unit; a second antenna connected to the filter unit; and a third antenna connected to the third front-end unit.

15 Claims, 7 Drawing Sheets

(56) References Cited

U.S. PATENT DOCUMENTS

| | | | |
|---|---|---|---|
| 2017/0118724 A1 | 4/2017 | Mohaupt et al. | |
| 2017/0257774 A1 | 9/2017 | Ghosh et al. | |
| 2017/0273090 A1 | 9/2017 | Jung et al. | |
| 2017/0288724 A1* | 10/2017 | Kamgaing | H03H 7/38 |
| 2018/0063031 A1* | 3/2018 | Wloczysiak | H04W 40/02 |
| 2018/0138927 A1 | 5/2018 | Nagumo et al. | |
| 2019/0074601 A1 | 3/2019 | Kim et al. | |
| 2019/0115946 A1* | 4/2019 | Pehlke | H04W 72/0453 |
| 2019/0140706 A1* | 5/2019 | Chang | H04B 7/0413 |
| 2019/0296783 A1* | 9/2019 | Naniwa | H01P 5/02 |

FOREIGN PATENT DOCUMENTS

| | | |
|---|---|---|
| KR | 101697356 | 1/2017 |
| KR | 1020170012122 | 2/2017 |
| KR | 1020170107302 | 9/2017 |
| KR | 1020170137881 | 12/2017 |
| WO | WO2014107400 | 7/2014 |
| WO | WO2017155279 | 9/2017 |

OTHER PUBLICATIONS

PCT/ISA/210 Search Report issued on PCT/KR2018/014541, pp. 5.
PCT/ISA/237 Written Opinion issued on PCT/KR2018/014541, pp. 5.
Kevin Walsh, 'RF Switches Guide Signals In Smart Phones', Microwaves & RF, (https://www.researchgate.net/publication/295678212_RF_Switches_Guide_Signals_In_Smart_Phones) pp. 11 (Sep. 2010).

* cited by examiner

ELECTRONIC DEVICE AND ANTENNA CONTROL METHOD OF ELECTRONIC DEVICE

PRIORITY

This application is a National Phase Entry of PCT International Application No. PCT/KR2018/014541 which was filed on Nov. 23, 2018, and claims priority to Korean Patent Application No. 10-2017-0158812, which was filed on Nov. 24, 2017, the content of each of which is incorporated herein by reference.

TECHNICAL FIELD

Various embodiments of the disclosure relates to an electronic device and an antenna control method of an electronic device.

BACKGROUND ART

The trend is to increase the number of electronic devices capable of wireless communication. In order to meet the increasing demand for wireless data traffic after commercialization of a 4G communication system, an improved 5G communication system or a pre-5G communication system is being developed. The electronic device can support 4G and 5G communication systems.

DISCLOSURE OF INVENTION

Technical Problem

The electronic device can operate carrier aggregation (CA) using two frequencies having different frequency bands (e.g., 3GPP long term evolution (LTE), 5th generation (5G)). At this time, the reception (RX) performance of the other frequency band may be deteriorated due to the influence of the harmonic signal of the signal of one frequency band.

According to various embodiments, in a carrier aggregation (CA) situation using two different frequency bands, the electronic device may control the antenna connection to prevent deterioration of the performance of a second frequency due to the harmonic of a first frequency.

Solution to Problem

According to various embodiments of the disclosure, an electronic device may include: a processor; a transceiver connected to the processor; a first front-end unit connected to the transceiver and performing transmission/reception on an LTE low-band frequency; a second front-end unit connected to the transceiver and performing transmission/reception at least one of an LTE middle band frequency and an LTE high-band frequency; a third front-end unit connected to the transceiver and performing transmission/reception at a 5G-band frequency; a diplexer unit connected to the first front-end unit and the second front-end unit; a filter unit connected to the third front-end unit; a first antenna connected to the diplexer unit; a second antenna connected to the filter unit; and a third antenna connected to the third front-end unit.

According to various embodiments of the disclosure, an antenna control method of an electronic device may include communicating, by the electronic device, simultaneously using a 5G band frequency, and at least one of an LTE middle band frequency or an LTE high band frequency; determining whether the electronic device performs transmission operation using the LTE middle band frequency or the LTE high band frequency; determining whether the electronic device performs a transmission (TX) operation using at least one band frequency of an LTE B2 band frequency, an LTE B3 band frequency and an LTE B4 band frequency, or the LTE high band frequency, when the electronic device performs a transmission operation using the LTE middle band frequency; determining whether a transmission output of the LTE middle band frequency or the LTE high band frequency is equal to or greater than a designated output, when it is determined that the electronic device performs a transmission operation using at least one band frequency of an LTE B2 band frequency, an LTE B3 band frequency and an LTE B4 band frequency, or the LTE high band frequency; determining whether a reception sensitivity of the 5G band frequency is equal to or greater than a designated sensitivity, when a transmission output of the LTE middle band frequency or the LTE high band frequency is equal to or greater than a designated output; and controlling to transmit/receive a signal through an antenna connected to a filter unit, if the reception sensitivity of the 5G band frequency is equal to or greater than a designated sensitivity.

According to various embodiments of the disclosure, an electronic device may include a first plate, a second plate facing in a direction opposite to the first plate, and a housing including a side member surrounding a space between the first plate and the second plate, wherein the side member may include: a first conductive portion; a second conductive portion; a third conductive portion positioned such that the first conductive portion is positioned between the second conductive portion and the third conductive portion; a first insulating portion positioned between the first conductive portion and the second conductive portion to contact; a second insulting portion positioned between the first conductive portion and the third conductive portion to contact the third conductive portion; and at least one communication circuit electrically connected to the first conductive portion, the second conductive portion and the third conductive portion, wherein the communication circuit transmits and/or receives a first signal including at least one of a first frequency component of a first frequency range, a second frequency component of a second frequency range higher than the first frequency range, or a third frequency component of a third frequency range higher than the first frequency range through the first conductive portion, transmits and/or receives a second signal including at least one of the second frequency component or the third frequency component through the second conductive portion, transmits and/or receives a third signal including a fourth frequency component of a fourth frequency range higher than the third frequency range through the third conductive portion, and the second frequency component has a harmonic frequency that at least partially overlaps the third frequency range, wherein the communication circuit further includes a filter circuit connected to the second conductive portion, and wherein the filter circuit is configured to block the harmonic frequency.

Advantageous Effects of Invention

The electronic device according to various embodiments of the disclosure can prevent performance of the second frequency from being deteriorated in a carrier aggregation (CA) situation of the first frequency band (e.g., LTE communication) and the second frequency band (e.g., 5G communication).

MODE FOR THE INVENTION

Figure 1A:
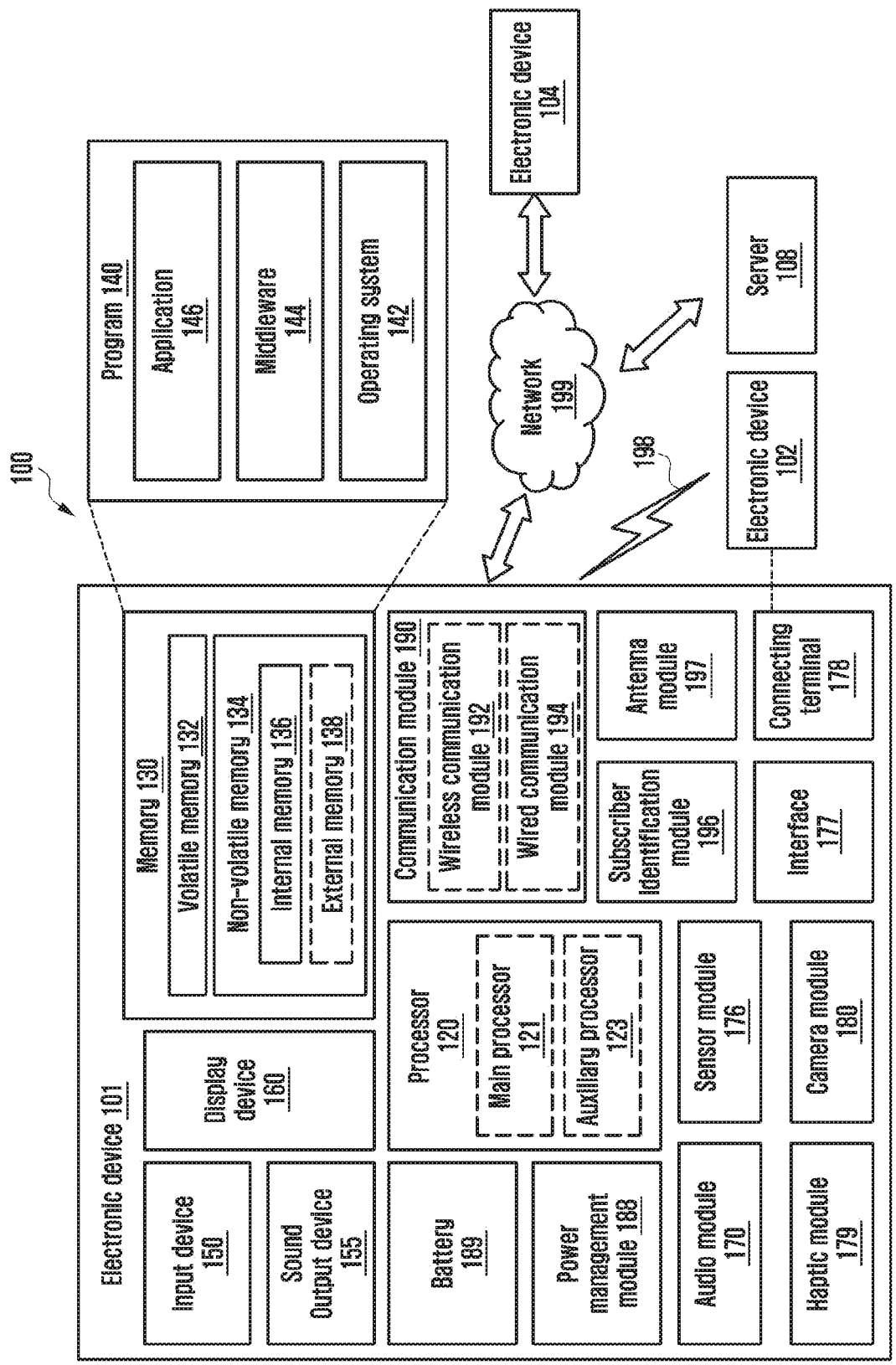
FIG. 1A is a block view of an electronic device in a network environment according to various embodiments.

FIG. 1A is a block diagram illustrating an electronic device 101 in a network environment 100 according to various embodiments. Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network using subscriber information stored in the subscriber identification module 196.

The antenna module 197 may transmit or receive a signal or power to or from the outside of the electronic device. In such a case, at least one antenna appropriate for a communication scheme used in the communication network, for example, by the communication module 190 (e.g., the wireless communication module 192) from the plurality of antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 1B:
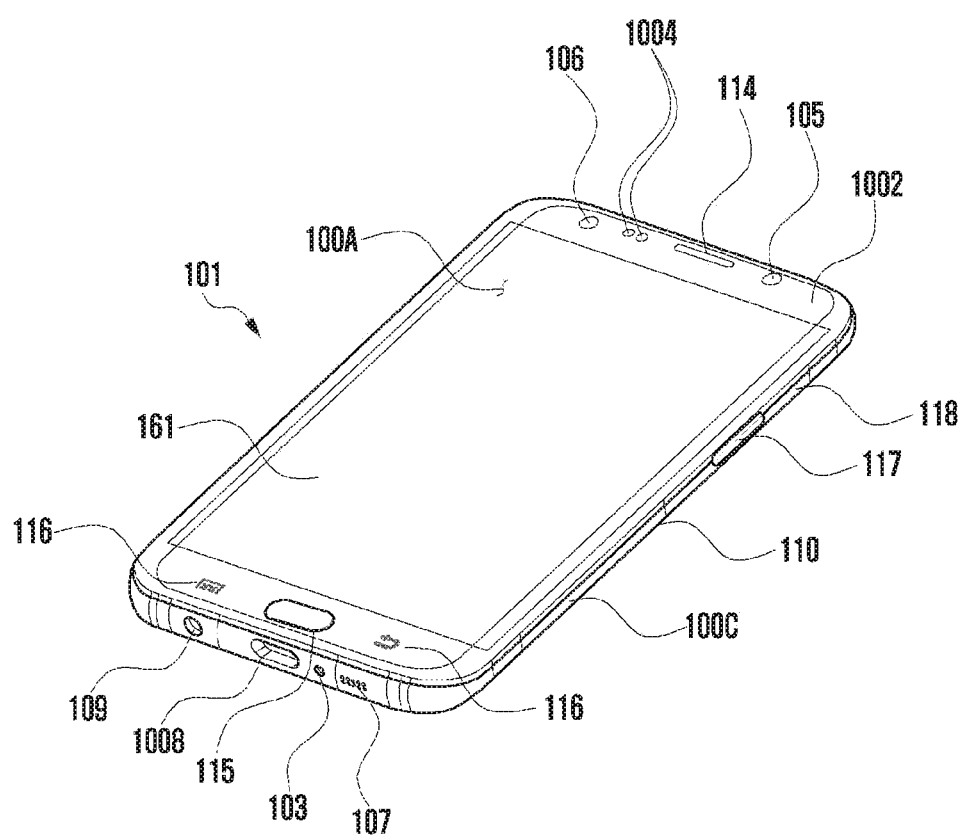
FIG. 1B is a perspective view of the front of a mobile electronic device according to an embodiment.

FIG. 1b is a front perspective view illustrating a mobile electronic device 101 according to various embodiments of the disclosure.

Figure 1C:
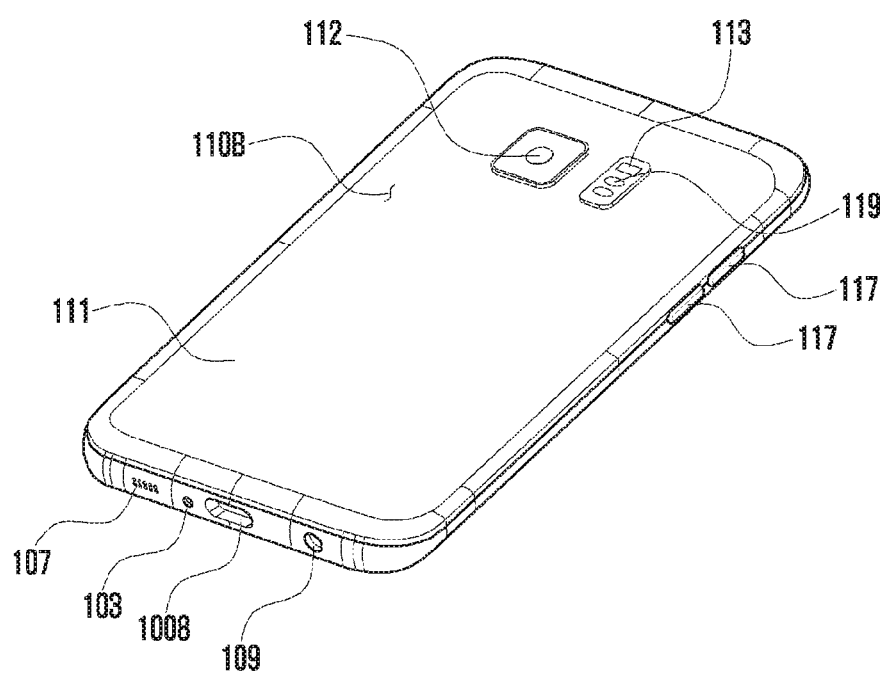
FIG. 1C is a perspective view of the rear of the electronic device of FIG. 1B.

FIG. 1C is a rear perspective view illustrating a mobile electronic device 101 of FIG. 1B according to various embodiments of the disclosure.

Referring to FIGS. 1B and 1C, the mobile electronic device 101 according to various embodiments may include a housing 110 including a first surface (or front surface) 110A, a second surface (or rear surface) 110B, and a side surface 110C enclosing a space between the first surface 110A and the second surface 110B. In one embodiment (not illustrated), the housing may refer to a structure forming some of the first surface 110A, the second surface 110B, and the side surface 110C. According to one embodiment, the first surface 110A may be formed by an at least partially substantially transparent front plate 1002 (e.g., a polymer plate or a glass plate including various coating layers). The second surface 110B may be formed by a substantially opaque rear plate 111. The rear plate 111 may be formed by, for example, coated or colored glass, ceramic, polymer, metal (e.g., aluminum, stainless steel (STS), or magnesium), or a combination of at least two of the above materials. The side surface 110C may be coupled to the front plate 1002 and the rear plate 111 and be formed by a side bezel structure (or "side member") 318 including a metal and/or a polymer. In some embodiments, the rear plate 111 and the side bezel structure 118 may be integrally formed and include the same material (e.g., metal material such as aluminum).

According to one embodiment, the mobile electronic device 101 may include at least one of a display 161; audio modules 103, 107, and 114; sensor modules 1004, and 119; camera modules 105, 112, and 113; key input device 115, 116, and 117; indicator 106; and connector holes 1008 and 109. In some embodiments, the mobile electronic device 101 may omit at least one (e.g., the key input device 115, 116, and 117 or the indicator 106) of the components or may further include other components.

The display 161 may be exposed through, for example, a substantial portion of the front plate 1002. The display 161 may be coupled to or disposed adjacent to a touch detection circuit, a pressure sensor capable of measuring intensity (pressure) of the touch, and/or a digitizer for detecting a stylus pen of a magnetic field method.

The audio modules 103, 107, and 114 may include a microphone hole 103 and speaker holes 107 and 114. The microphone hole 103 may dispose a microphone for obtaining an external sound therein; and, in some embodiments, a plurality of microphones may be disposed to detect a direction of a sound. The speaker holes 107 and 114 may include an external speaker hole 107 and a call receiver hole 114. In some embodiments, the speaker holes 107 and 114 and the microphone hole 103 may be implemented into one hole, or the speaker may be included without the speaker holes 107 and 114 (e.g., piezo speaker).

The sensor modules 1004 and 119 may generate an electrical signal or a data value corresponding to an operating state inside the mobile electronic device 101 or an environment state outside the mobile electronic device 101. The sensor modules 1004, and 319 may include, for example, a first sensor module 1004 (e.g., proximity sensor) and/or a second sensor module (not illustrated) (e.g., fingerprint sensor), disposed at the first surface 110A of the housing 110, and/or a third sensor module 119 (e.g., a heart rate monitor (HRM) sensor), disposed at the second surface 110B of the housing 110. The fingerprint sensor may be disposed at the second surface 110B as well as the first surface 110A (e.g., home key button 115) of the housing 110. The mobile electronic device 101 may further include a sensor module (not illustrated), for example, at least one of a gesture sensor, gyro sensor, air pressure sensor, magnetic sensor, acceleration sensor, grip sensor, color sensor, IR sensor, biometric sensor, temperature sensor, humidity sensor, and illumination sensor 1004.

The camera modules 105, 112, and 113 may include a first camera device 105 disposed at the first surface 110A of the mobile electronic device 101, a second camera device 112 disposed at the second surface 110B thereof, and/or a flash 113. The camera modules 105 and 112 may include one or a plurality of lenses, an image sensor, and/or an image signal processor. The flash 113 may include, for example, a light emitting diode or a xenon lamp. In some embodiments, two or more lenses (infrared camera, wide angle and telephoto lens) and image sensors may be disposed at one surface of the mobile electronic device 101.

The key input device 115, 116, and 117 include a home key button 115 disposed on the first surface 110A of the housing 110, and a touch pad 116 disposed around the home key button 115 and/or the side key button 117 disposed on the side 110C of the housing 110. In another embodiment, the electronic device 101 may not include some or all of the key input device 115, 116, and 117 mentioned above. The key input device 115, 116, and 117 not included in the electronic device 101 may be implemented in other forms such as soft keys on the display 161.

The indicator 106 may be disposed at, for example, the first surface 110A of the housing 110. The indicator 106 may provide, for example, status information of the mobile electronic device 101 in an optical form. The indicator 106 may include, for example, a light emitting diode (LED).

The connector hole 1008 and 109 may include a first connector hole 108 that may receive a connector (e.g., a USB connector) for transmitting and receiving power and/or data to and from an external electronic device and/or a second connector hole (e.g., earphone jack) 109 that can receive a connector for transmitting and receiving audio signals to and from an external electronic device.

Figure 2:
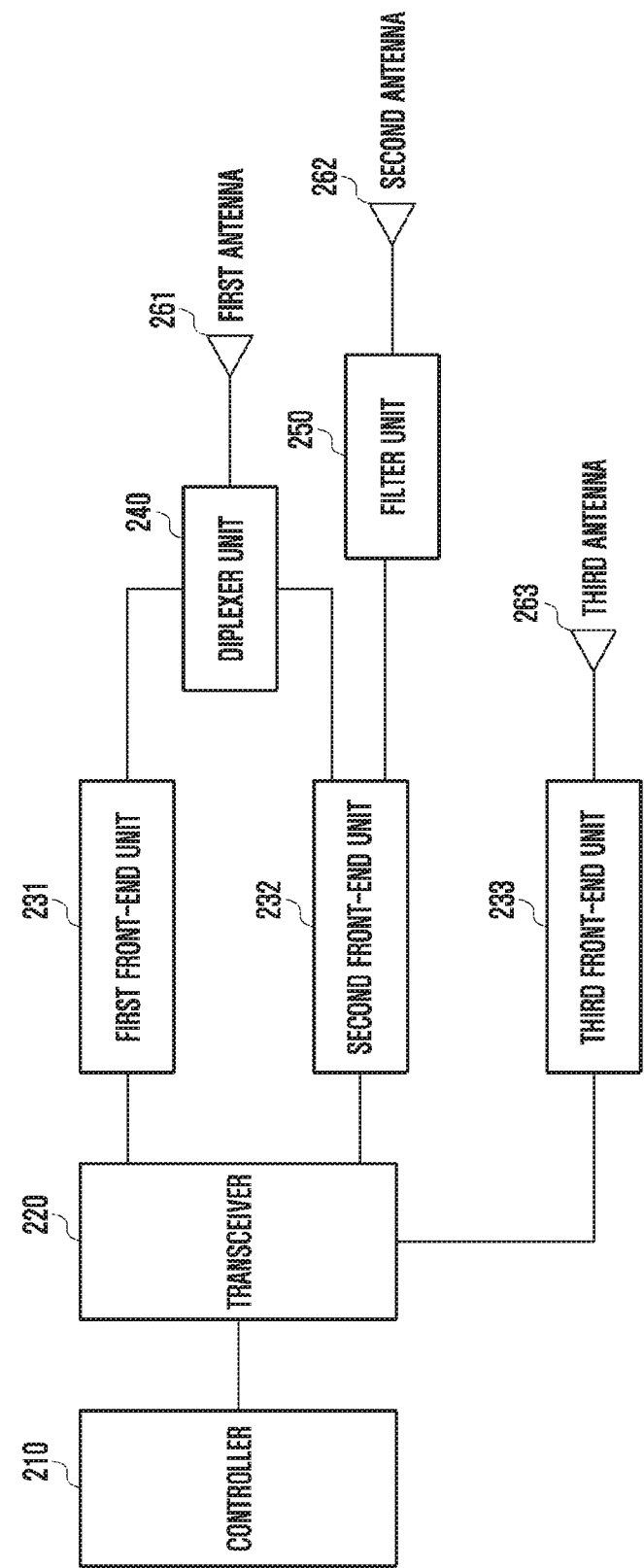
FIG. 2 is a block view of an electronic device according to various embodiments of the disclosure.

FIG. 2 is a block view of an electronic device 101 according to various embodiments of the disclosure.

According to various embodiments, the electronic device 101 may include a controller 210, a transceiver 220, a first front-end unit 231, a second front-end unit 232, a third front-end unit 233, a diplexer unit 240, a filter unit 250, a first antenna 261 (e.g., a first conductive portion), a second antenna 262 (e.g., a second conductive portion), and a third antenna 263 (e.g., a third conductive part).

According to an embodiment, the controller 210 may be the processor 120 or a communication module 190 of FIG. 1A. The controller 210 may control the transceiver 220 to transmit/receive communication signals.

According to an embodiment, the transceiver 220 may modulate the signals received from the first front-end unit 231, the second front-end unit 232, and the third front-end unit 233 under the control of the control unit 210 into signals that can be processed by the controller 210, or modulate the signals received from the control unit 210 into signals that can be processed by the first front-end unit 231, the second front-end unit 232, and the third front-end unit 233.

According to an embodiment, the first front-end unit 231, the second front-end unit 232, and the third front-end unit 233 are front-end modules and may perform operations of connecting antennas and transceivers and separating transmission/reception signals.

According to an embodiment, the first front-end unit 231, the second front-end unit 232, and the third front-end unit 233 may serve to amplify a transmission signal or filter and amplify a received signal.

According to an embodiment, the first front-end unit 231, the second front-end unit 232, and the third front-end unit 233 may each include at least one of a power amplifier module (PAM), a duplexer, a multiplexer, and antenna switching module.

According to an embodiment, the first front-end unit 231 and the second front-end unit 232 may be connected to the diplexer unit 240 connected to the first antenna 261.

According to an embodiment, the diplexer unit 240 may include a diplexer. The diplexer unit 240 may combine or separate the signals transmitted from the first front-end unit 231 and the second front-end unit 232 and transmit them to the first antenna 261. According to an embodiment, the diplexer unit 240 may transmit a signal received from the first antenna 261 by combining or separating the first front-end unit 231 and the second front-end unit 232.

According to an embodiment, the diplexer unit 240 may separate the LTE low-band signal (e.g., the first frequency component), the LTE middle band signal (e.g., the second frequency component), and the LTE high-band signal (e.g., third frequency component) transmitted/received to/from the first antenna 261 into an LTE low-band signal, an LTE middle band signal, and an LTE high-band signal.

According to an embodiment, the frequency range of the LTE low-band signal may be between 700 MHz and 900 MHz, the frequency range of the LTE middle band signal may be between 1.7 GHz and 2.1 GHz, and the frequency range of the LTE high-band signal may be 2.3 GHz and 2.7 GHz.

According to an embodiment, the filter unit 250 may be coupled to the second front-end unit 232 and the second antenna 262. The filter unit 250 may transmit a signal transmitted from the second front-end unit 232 to the second antenna 262. The filter unit 250 may transmit a signal transmitted from the second antenna 262 to the second front-end unit 232. According to an embodiment, the filter unit 250 may be a low pass filter. For example, the filter unit 250 may block a second harmonic band of the middle band frequencies of the LTE band (e.g., LTE B2 band frequency, LTE B3 band frequency, or LTE B4 band frequency), or the LTE high band frequency. For example, the second harmonic frequency of the middle band frequency (e.g., LTE B2 band frequency, LTE B3 band frequency, LTE B4 band frequency) may be about 3.42 GHz to 3.82 GHz. As another example, the second harmonic frequency of the LTE high-band frequency may be from about 4 GHz to about 5 GHz.

According to an embodiment, the low-pass filter of the filter unit 250 may be implemented as a surface acoustic wave (SAW) filter, a passive element, an F-bar filter, or an active element.

According to an embodiment, the first front-end unit 231 may support a low band frequency among the LTE frequency bands. The second front-end unit 232 may support a middle band and a high band frequency among LTE frequency bands. The third front-end unit 233 may support a 5G frequency band (e.g., a fourth frequency component). For example, the 5G frequency band may be a 6 GHz or less (sub-6) 5G band, and may be a band of about 3.3 GHz to about 4.2 GHz or a band of 3.3 GHz to 6 GHz.

According to an embodiment of the disclosure, when using the first antenna 261 as the main antenna and then using both the LTE frequency band and the 5G frequency band, the electronic device 101 may change an antenna that transmits and receives at least a part of the LTE band from the first antenna 261 to the second antenna 262, based on a designated condition.

According to an embodiment, the second antenna 262 may not only receive a main frequency band signal, but also improve a data throughput by adding a path capable of receiving multiple frequency bands. For example, the second antenna 262 may be applied to 4RX, 4RXD, or high order Rx diversity technology.

According to an embodiment, the second front-end 232 may include an antenna switching module (ASM) to change the antenna used from the first antenna 261 to the second antenna 262 or to change the antenna from the second antenna 262 to the first antenna 261. The antenna switching module (ASM) included in the second front-end unit 232 may change the antenna used from the first antenna 261 to the second antenna 262, or change the antenna used from the second antenna 262 to the first antenna 261 under the control of the control unit 210.

According to an embodiment, under the control of the control unit 210, the electronic device 101 may perform a carrier aggregation (CA) operation with an LTE band frequency and a 5G band frequency. For example, the carrier aggregation (CA) operation may be an operation that simultaneously uses the LTE band frequency and the 5G band frequency.

According to an embodiment, the electronic device 101 may determine whether to operate in the LTE middle band frequency (e.g., middle band) or LTE high-band frequency (high band) during the carrier aggregation (CA) operation. For example, the electronic device 101 may determine whether to perform a transmission (TX) operation using at least band frequency of LTE B2 band frequency, LTE B3 band frequency and LTE B4 band frequency among the LTE middle band frequencies or to perform a transmission (TX) operation in the LTE high-band frequency, during carrier aggregation (CA) operation. The electronic device 101 may, for example, transmit/receive signals through the second front-end unit 232 in order to communicate in the LTE middle band frequency or the LTE high-band frequency.

According to an embodiment, the electronic device 101 may determine whether the transmission output is greater than or equal to the designated output, when performing a transmission (TX) operation using the LTE middle band frequency (e.g., LTE B2 band frequency, LTE B3 band frequency and LTE B4 band frequency) or the LTE high-band frequency while performing a carrier aggregation (CA) operation.

According to various embodiments of the disclosure, assuming that the coupling factor (CF) of the coupler of the second front-end unit 232 is 20 dB, the electronic device 101 may determine whether the transmission output coupled through the feedback reception output is equal to or greater than −20 dBm (e.g., a designated output).

According to various embodiments of the disclosure, the electronic device 101 may determine whether the transmission output is equal to or greater than a designated output (e.g., 0 dBm) of total radiated power (TRP).

According to an embodiment, the electronic device 101 may determine whether the transmission output for the LTE middle band frequency or the transmission output for the LTE high-band frequency is greater than or equal to a designated output, and the 5G reception (RX) sensitivity is greater than or equal to a designated sensitivity, when an LTE middle band frequency (e.g., LTE B2 band frequency, LTE B3 band frequency, and LTE B4 band frequency) or LTE high-band frequency is used to perform a transmit (TX) operation during a carrier aggregation (CA) operation. The designated sensitivity may be, for example, −90 dBm.

According to an embodiment, the electronic device 101 may determine whether the transmission output is greater than or equal to the designated output, and the 5G reception (RX) sensitivity is greater than or equal to the designated output, when performing a transmission (transmit, TX) operation using the LTE middle band frequency, or LTE high-band frequency while performing a carrier aggregation (CA) operation. The designated sensitivity may be, for example, −90 dBm. For example, under the control of the control unit 210, the electronic device 101 may change the LTE main antenna when the transmission output is greater than or equal to the designated output and the 5G reception (RX) sensitivity is greater than or equal to the designated sensitivity, when the electronic device 101 performs transmission (TX) operation using at least one of the LTE B2 band frequency, the LTE B3 band frequency, and the LTE B4 band frequency, or the LTE high-band frequency, among the LTE middle band frequencies during the carrier aggregation (CA) operation.

According to an embodiment, the electronic device 101 may change the LTE main antenna from the first antenna 261 to the second antenna 262 when the transmission output is greater than or equal to the designated output and the 5G reception (RX) sensitivity is greater than or equal to the designated sensitivity, when performing a transmission (TX) operation using at least one of the LTE B2 band frequency, LTE B3 band frequency, and LTE B4 band frequency among LTE middle band frequencies or the LTE high-band frequency during carrier aggregation (CA) operation.

Referring to Table 1, the second harmonic frequency of the LTE B2 frequency band, the LTE B3 frequency band, the LTE B4 frequency band, or the second harmonic frequency of the LTE high-band frequency, which is an LTE middle band frequency among the LTE frequency bands is similar to the 5G frequency band.

TABLE 1

| 5G frequency band of third front-end unit 233 | Second harmonic frequency of LTE B2 | Second harmonic frequency of LTE B3 | Second harmonic frequency of LTE B4 |
| --- | --- | --- | --- |
| 3.3~4.2 GHz | 3.7~3.82 GHz | 3.42~3.57 GHz | 3.42~3.51 GHz |

In a carrier aggregation (CA) situation using at least one of the 5G frequency band and LTE B2 frequency band, LTE B3 frequency band, LTE B4 frequency band, LTE high-band frequency at the same time, the reception of the 5G frequency band may be deteriorated, due to the harmonic components of the electronic device 101 in the LTE B2 frequency band, LTE B3 frequency band, and LTE B4 frequency band.

At this time, since if the electronic device 101 radiates a signal through the second antenna 262, the signal must pass through the filter unit 250, and thus, the electronic device 101 can remove and output the second harmonic signal of the LTE B2 band frequency, LTE B3 band frequency, LTE B4 band frequency, and LTE high-band frequency due to the characteristics of the filter unit 250 having a low-pass filter characteristic and the 5G band frequency received through the third front-end unit 233 may be received without deterioration.

Figure 4:
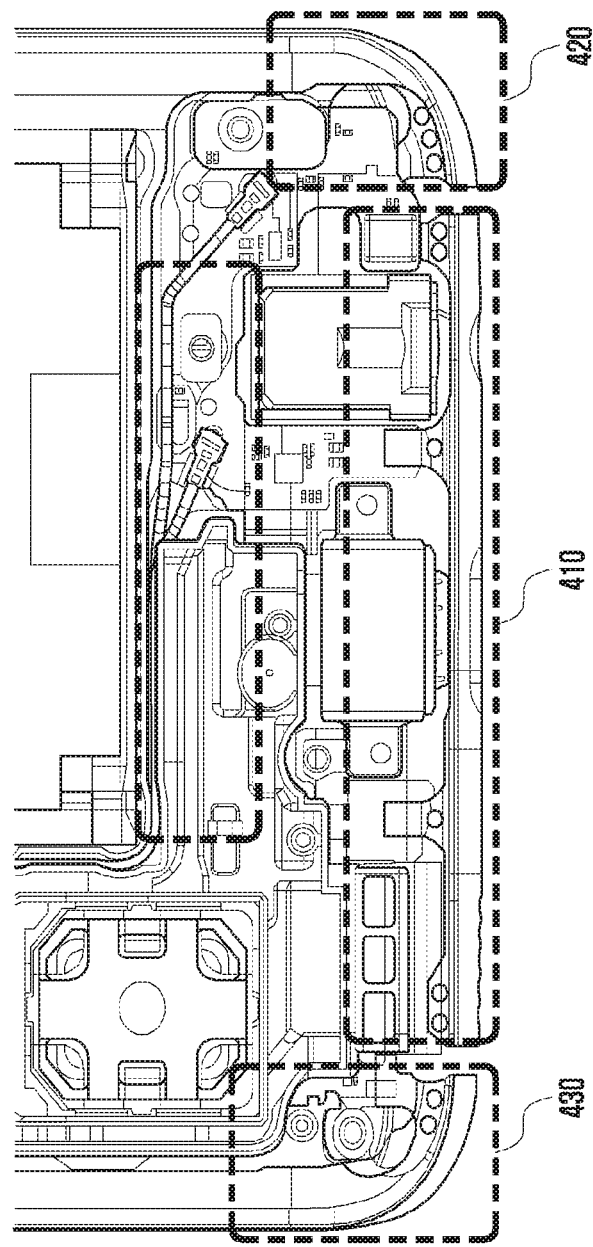
FIG. 4 is a view related to an antenna arrangement of an electronic device according to an embodiment of the disclosure.

Referring to FIGS. 2 and 4, the first antenna 261 and the third antenna 263 may be in adjacent positions.

According to an embodiment, when performing a transmission (TX) operation using at least one of the LTE B2 band frequency, LTE B3 band frequency and LTE B4 band frequency among an LTE middle band frequencies or an LTE high-band frequency, during performing a carrier aggregation (CA) operation, if the transmission output is higher than the designated output and the 5G reception (RX) sensitivity is higher than the designated sensitivity, since when the electronic device changes the LTE main antenna from the first antenna 261 to the second antenna 262, the distance between the third antenna 253 and the second antenna 262 is relatively greater than the distance between the third antenna 253 and the first antenna 261, the separation between the two antennas increases, resulting in less harmonic signals and the 5G band frequency can be received without deterioration.

According to an embodiment, in order to radiate a signal through the second antenna 262 by changing from the first antenna 261 to the second antenna 262, the second front-end unit 232 may include an antenna switching module. For example, the electronic device 101 may transmit a signal through the first antenna 261, when it is determined that the electronic device 101 does not operate in the LTE middle band frequency or LTE high-band frequency while performing a carrier aggregation (CA) operation.

According to an embodiment, the electronic device 101 may transmit a signal through the first antenna 261, when it is determined that the electronic device 101 does not perform a transmit (TX) operation using at least one band frequency of an LTE middle band frequency (e.g., LTE B2 band frequency, LTE B3 band frequency, and LTE B4 band frequency) or an LTE high-band frequency during performing a carrier aggregation (CA) operation.

According to an embodiment, the electronic device 101 may transmit a signal through the first antenna 251, if it is determined that the transmission output is less than the designated output when performing a transmission (TX) operation using at least one of the band frequency of the LTE middle band frequency (e.g., LTE B2 band frequency, LTE B3 band frequency, and LTE B4 band frequency) or the LTE high-band frequency while performing a carrier aggregation (CA) operation.

According to an embodiment, the electronic device 101 may transmit a signal through the first antenna 251, if it is determined that the transmission output is above the designated output and the 5G reception (RX) sensitivity is less than or equal to the designated sensitivity when performing a transmission (TX) operation using at least one of the band frequency among the LTE middle band frequencies (e.g., LTE B2 band frequency, LTE B3 band frequency, and LTE B4 band frequency) or LTE high-band frequency while performing a carrier aggregation (CA) operation.

Figure 3:
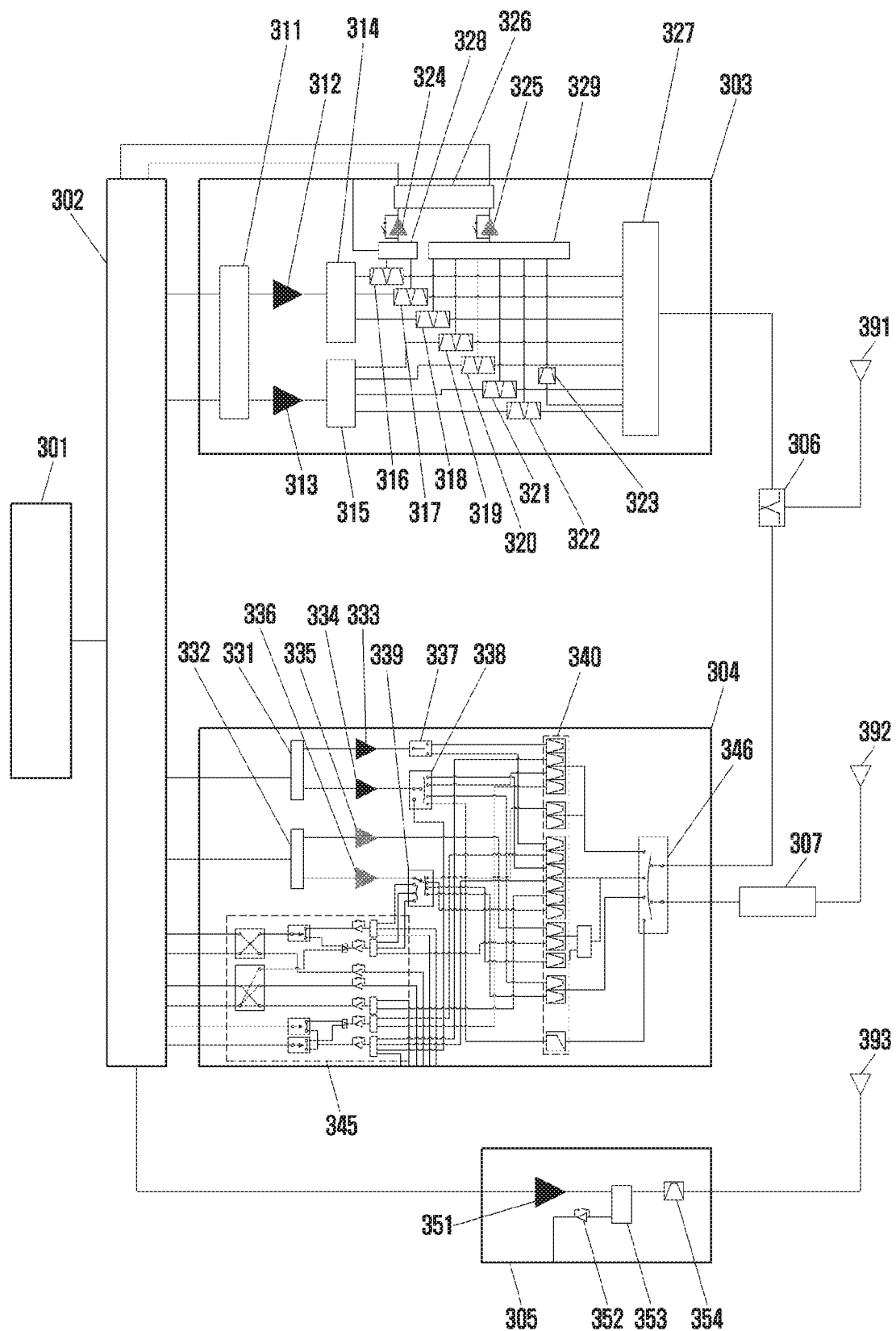
FIG. 3 is a block view of an electronic device according to various embodiments of the disclosure.

FIG. 3 is a block view of an electronic device 101 according to various embodiments of the disclosure.

According to an embodiment, the electronic device 101 may include a controller 301 (e.g., the controller 210 of FIG. 2), a transceiver 302 (e.g., the transceiver 220 of FIG. 2), a first front-end unit 303 (e.g., the first front-end unit 231 of FIG. 2), a second front-end unit 304 (e.g., the second front-end unit 232 of FIG. 2), a third front-end unit 305 (e.g., the third front-end unit 233 of FIG. 2), a diplexer unit 306 (e.g., the diplexer unit 240 of FIG. 2), a filter unit 307 (e.g., the filter unit 250 of FIG. 2), a first antenna 391 (e.g., the first antenna 261 of FIG. 2), a second antenna 392 (e.g., the second antenna 262 of FIG. 2), and a third antenna (e.g., the third antenna 263 of FIG. 2).

According to an embodiment, the controller 301 may be the processor 120 or a communication module 190 of FIG. 1A. The controller 301 may control the transceiver 302 to transmit/receive communications signals.

According to an embodiment, the transceiver 302 may modulate the signals received from the first front-end unit 303, the second front-end unit 304, and the third front-end unit 305 under the control of the controller 301 into signals that can be processed by the controller 301, or modulate the signals received from the control unit 301 into signals that can be processed by the first front-end unit 303, the second front-end unit 304, and the third front-end unit 305.

According to an embodiment, the first front-end unit 303, the second front-end unit 304, or the third front-end unit 305 is front-end module and may perform operations of connecting antennas and transceivers and separating transmission/reception signals.

According to an embodiment, the first front-end unit 303, the second front-end unit 304, or the third front-end unit 305 may serve to amplify a transmission signal or filter and amplify a received signal.

According to an embodiment, the first front-end unit 303, the second front-end unit 304, and the third front-end unit 305 may each include at least one of a power amplifier module (PAM), a duplexer, a multiplexer, and antenna switching module.

According to an embodiment, the first front-end unit 303 and the second front-end unit 304 may be connected to the diplexer unit 306 connected to the first antenna 391.

According to an embodiment, the diplexer unit 306 may include a diplexer. The diplexer unit 306 may combine or separate the signals transmitted from the first front-end unit 303 and the second front-end unit 304 and transmit them to the first antenna 391. The diplexer unit 306 may transmit a signal received from the first antenna 391 by combining or separating the first front-end unit 303 and the second front-end unit 304.

According to an embodiment, the filter unit 307 may be coupled to the second front-end unit 304 and the second antenna 392. The filter unit 307 may transmit a signal transmitted from the second front-end unit 304 to the second antenna 392. The filter unit 307 may transmit a signal transmitted/received from the second antenna 392 to the second front-end unit 304.

According to an embodiment, the filter unit 307 may be a low pass filter. For example, the filter unit 250 may block a second harmonic band of an LTE B2 band frequency, an LTE B3 band frequency, an LTE B4 band frequency corresponding to middle band frequencies of the LTE bands, or an LTE high band frequency.

For example, the second harmonic frequency of the LTE B2 band frequency, the LTE B3 band frequency, the LTE B4 band frequency may be about 3.42 GHz to 3.82 GHz. As another example, the second harmonic frequency of the LTE high-band frequency may be from about 4 GHz to about 5 GHz. The low-pass filter of the filter unit 307 may be implemented, for example, as a surface acoustic wave (SAW) filter, a passive element, an F-bar filter, or an active element.

According to an embodiment, the first front-end unit 303 may support a low band frequency among the LTE frequency bands.

According to an embodiment, the second front-end unit 304 may support a middle band frequency and a high band frequency among the LTE frequency bands.

According to an embodiment, the third front-end unit 305 may support a 5G frequency band. For example, the 5G frequency band may be 6 GHz or less (sub-6) 5G band, and may be a band of about 3.3 GHz to about 4.2 GHz or a band of 3.3 GHz to 6 GHz.

According to an embodiment of the disclosure, when using the first antenna 391 as the main antenna and then using both the LTE frequency band and the 5G frequency band, the electronic device 101 may change an antenna that transmits and receives the LTE band from the first antenna 391 to the second antenna 392, based on a designated condition.

According to an embodiment, the second front-end 304 may include an antenna switching module (ASM) 346 to change the antenna used from the first antenna 391 to the second antenna 392 or to change the antenna from the second antenna 392 to the first antenna 391. The antenna switching module (ASM) 346 included in the second front-end unit 304 may change the antenna used from the first antenna 391 to the second antenna 392, or change the antenna used from the second antenna 392 to the first antenna 391 under the control of the control unit 301.

According to an embodiment, the first front-end unit 303 may include at least one switches 311, 314, 315, 326, 327, 328 and 329, at least one power amplification modules 312, 313, 324 and 325, at least one duplexers 316, 317, 318, 319, 320, 321 and 322, and at least one filter 323.

According to an embodiment, the first front-end unit 303 may transmit a signal to the first power amplification module 312 or the second power amplification module 313 through the first switch 311, according to the band of the signal received from the transceiver 302.

According to an embodiment, the signal transmitted from the first power amplification module 312 or the second power amplification module 313 of the first front-end unit 303 may be transmitted through the second switch 314 or the third switch 315, and the signal transmitted to the second switch 314 or the third switch 315 may be combined or separated to be transmitted to a first antenna switching module 327 through at least one duplexers 316, 317, 318, 319, 320, 321 and 322.

According to an embodiment, the signal received through the first antenna 391 and the diplexer unit 306 may be transmitted to the first front-end unit 303. The signal may be transmitted to at least one duplexers 316, 317, 318, 319, 320, 321 and 322 through the antenna switching module 327 of the first front-end unit 303, and then may be transmitted to the fourth switch 328 or the fifth switch 329. The signal transmitted to the fourth switch 328 or the fifth switch 329 may be transmitted to the sixth switch 326 through the third power amplification module 324 or the fourth power amplification module 325 and then transmitted to the transceiver 302.

According to an embodiment, the second front-end unit 304 may include at least one switches 331, 332, 337 and 339, at least one power amplification modules 333, 334, 335 and 336, a multiplexer 340 including at least one duplexers, a reception module 345, and an antenna switching module 346.

According to an embodiment, the second front-end unit 304 may transmit the signal to the fifth power amplification module 333, the sixth power amplification module 334, the seventh power amplification module 335, or the eighth power amplification module 336 through the seventh switch 331 or the eighth switch 332, according to the band of the signal transmitted from the transceiver.

According to an embodiment, the signal transmitted to the fifth power amplification module 333, the sixth power amplification module 334, the seventh power amplification module 335, or the eighth power amplification module 336 of the second front-end unit 304 may transmitted to the ninth switch 337, the tenth switch 338 or the eleventh switch 339, and the signal transmitted to the ninth switch 337, the tenth switch 338 or the eleventh switch 339 may be combined or separated through the multiplexer 340 including at least one duplexers to be transmitted to the antenna switching module 346. The signal transmitted to the second antenna switching module 346 may be transmitted to the diplexer unit 306 or the filter unit 307.

According to an embodiment, the signal transmitted through the first antenna 391 and the diplexer unit 306 or the signal transmitted through the second antenna 392 and the filter unit 307 may be transmitted to the second front tend unit 304. The signal transmitted through the first antenna 391 and the diplexer unit 306 or the signal transmitted through the second antenna 392 and the filter unit 307 may be transmitted to the multiplexer 340 including at least one duplexers through the second antenna switching module 346 of the second front-end unit 304 and then transmitted to the tenth switch 338 or the eleventh switch 339. The signal transmitted to the tenth switch 338 or the eleventh switch 339 may be transmitted to the reception module 345 and then transmitted to the transceiver 302.

According to an embodiment, the reception module 345 may include at least one power amplification module, at least one switch, and at least one duplexer.

According to an embodiment, the third front-end unit 305 may include a twelfth switch 353, at least one power amplification modules 351 and 352, and a duplexer 354.

The third front-end unit 305 may transmit the signal received from the transceiver 302 to the third antenna 393 through the ninth power amplification module 351, the twelfth switch 353, and the duplexer 354. The third front-end unit 305 may transmit the signal received through the third antenna 393 to the transceiver 302 through the duplexer 354, the twelfth switch 353, and the tenth power amplifying module 352.

According to an embodiment, the electronic device 101 may perform a carrier aggregation (CA) operation using the LTE band frequency and the 5G band frequency. For example, the carrier aggregation (CA) operation may be an operation that simultaneously uses the LTE band frequency and the 5G band frequency.

The electronic device 101 may determine whether the electronic device 101 operates on the LTE middle band frequency or the LTE high-band frequency during the carrier aggregation (CA) operation, under the control of the control unit 301.

In order to operate in the LTE middle band frequency, a signal may be transmitted and received through the first front-end unit 303 or the second front-end unit 304.

The electronic device 101 may determine whether the electronic device 101 operates on the LTE middle band frequency or the LTE high-band frequency while performing a carrier aggregation (CA) operation, under the control of the control unit 301.

The electronic device 101 may determine whether electronic device 101 performs a transmission (TX) operation using at least one of an LTE B2 band frequency, an LTE B3 band frequency, and an LTE B4 band frequency among LTE middle band frequencies, or an LTE high-band frequency while performing a carrier aggregation (CA) operation, under the control of the control unit 301.

The electronic device 101 may determine whether the transmission output for the LTE middle band frequency or the transmission output for the LTE high-band frequency is greater than or equal to a designated output, under the control of the control unit 301, when the electronic device 101 performs a transmission (TX) operation using at least one of the LTE B2 band frequency, LTE B3 band frequency, and LTE B4 band frequency among LTE middle band frequencies or LTE high-band frequency while performing a carrier aggregation (CA) operation.

According to various embodiments of the disclosure, when the coupling factor (CF) of the coupler of the second front-end unit 304 is assumed to be 20 dB, it may be determined whether the transmission output coupled through the feedback reception output is −20 dBm (e.g., a designated output) or more.

The electronic device 101 may determine whether the transmission output is greater than or equal to the designated output and the 5G reception (RX) sensitivity is greater than or equal to the designated sensitivity, under the control of the control unit 301, when the electronic device 101 performs a transmission (TX) operation using at least one of the LTE B2 band frequency, LTE B3 band frequency, and LTE B4 band frequency among LTE middle band frequencies or LTE high-band frequency, while performing a carrier aggregation (CA) operation. The designated sensitivity can be, for example, −90 dBm.

The electronic device 101 may change the LTE main antenna when the transmission output is greater than or equal to the designated output and the 5G reception (RX) sensitivity is greater than or equal to the designated sensitivity, under the control of the control unit 301, when the electronic device 101 performs a transmission (TX) operation using at least one of the LTE B2 band frequency, LTE B3 band frequency, and LTE B4 band frequency among LTE middle band frequencies or LTE high-band frequency while performing a carrier aggregation (CA) operation.

The electronic device 101 may change the LTE main antenna from the first antenna 391 to the second antenna 392 when the transmission output is greater than or equal to the designated output and the 5G reception (RX) sensitivity is greater than or equal to the designated sensitivity, under the control of the control unit 301, when the electronic device 101 performs a transmission (TX) operation using at least one of the LTE B2 band frequency, LTE B3 band frequency, and LTE B4 band frequency among LTE middle band frequencies or LTE high-band frequency while performing a carrier aggregation (CA) operation.

At this time, since the signal needs to pass through the filter unit 307 when the signal is radiated through the second antenna 392, due to the characteristics of the filter unit 307 having low-pass filter characteristics, the second harmonic signal of LTE B2 band frequency, LTE B3 band frequency, LTE B4 band frequency, and LTE high-band frequency can be removed and output, and the 5G band frequency received through the third front-end unit 305 can be received without degradation.

In order to emit a signal through the second antenna 392 by changing from the first antenna 391 to the second antenna 392, the second front-end 304 may include an antenna switching module 346.

Referring to FIGS. 3 and 4, the first antenna 261 and the third antenna 263 may be in adjacent positions.

According to an embodiment, when the electronic device 101 performs a transmission (TX) operation using at least one of the LTE B2 band frequency, LTE B3 band frequency, and LTE B4 band frequency among the LTE middle band frequencies or LTE high-band frequency while performing a carrier aggregation (CA) operation, if the transmission output is greater than the designated output and the 5G reception (RX) sensitivity is greater than the designated sensitivity, when the electronic device 101 changes the LTE main antenna from the first antenna 391 to the second antenna 392, the distance between the third antenna 253 and the second antenna 262 is relatively longer than the distance between the third antenna 393 and the first antenna 391, so that the isolation between the two antennas is increased, resulting in less harmonic signals and the 5G band frequency can be received without degradation.

The electronic device 101 may transmit a signal through the first antenna 391 under the control of the controller 301 when it is determined that the electronic device 101 does not operate in the LTE middle band frequency or the LTE high-band frequency while performing the carrier aggregation (CA) operation.

The electronic device 101 may transmit a signal through the first antenna 391 under the control of the controller 210, if it is determined that the transmission (TX) operation is not performed using at least one of the LTE B2 band frequency, LTE B3 band frequency, and LTE B4 band frequency among the LTE middle band frequencies, or LTE high-band frequency while performing a carrier aggregation (CA) operation.

The electronic device 101 may transmit a signal through the first antenna 391, when it is determined that the transmission output is equal to or less than the designated output, under the control of the control unit 210, when the electronic device 101 performs a transmission (TX) operation using at least one of the LTE B2 band frequency, LTE B3 band frequency, and LTE B4 band frequency among the LTE middle band frequencies or LTE high-band frequency while performing a carrier aggregation (CA) operation.

The electronic device 101 may transmit a signal through the first antenna 391 when it is determined that the transmission output is equal to or greater than the designated output and the 5G reception (RX) sensitivity is equal to or less than the designated sensitivity, under the control of the control unit 210, when the electronic device 101 performs a transmission (TX) operation using at least one of the LTE B2 band frequency, LTE B3 band frequency, and LTE B4 band frequency among the LTE middle band frequencies or LTE high-band frequency while performing a carrier aggregation (CA) operation.

FIG. 4 is a view related to an antenna arrangement of an electronic device 101 according to an embodiment of the disclosure.

According to an embodiment, the antenna may be disposed in a body of an electronic device 101, for example, a bezel area.

According to an embodiment, the electronic device 101 may include a first antenna 420 (e.g., the first antenna 261 of FIG. 2, or the first antenna 391 of FIG. 3), a second antenna 410 (e.g., the second antenna 262 of FIG. 2, or the second antenna 392 of FIG. 3), and a third antenna 430 (e.g., the third antenna 253 of FIG. 2, or the third antenna 393 of FIG. 3).

According to an embodiment, the second antenna 420 and the third antenna 430 may be disposed in the left and right bezel areas around the first antenna 410. According to an embodiment, an insulator may be disposed between the first antenna 410 and the second antenna 420, and an insulator may be disposed between the first antenna 410 and the third antenna 430.

According to an embodiment, the first antenna 410, the second antenna 420 and the third antenna 430 may each be formed of a conductive member.

According to an embodiment, the first antenna 410, the second antenna 420 and the third antenna 430 may be connected to a communication device such as the front-end module, the duplexer, and the transceiver mentioned in FIGS. 2 to 3.

For example, in the bezel area or a side member 118 of the electronic device 101, the first antenna 410 may be disposed in a straight area, which is an area where the microphone hole 103 or the connector hole 1008 is disposed. As another example, the second antenna 420 and the third antenna 430 may be disposed in the edge area.

According to an embodiment, the electronic device 101 may include the side member 118 surrounding a space between a front plate 1002 and a back plate 111 and configuring a space between the front plate 1002 and the back plate 111 included therebetween.

The electronic device 101 may configure a housing using a front plate 1002, a back plate 111, and the side member 118 surrounding the space between the front plate 1002 and the back plate 111.

According to an embodiment, when the electronic device 101 performs a transmission (TX) operation using at least one of the LTE B2 band frequency, LTE B3 band frequency, and LTE B4 band frequency among the LTE middle band frequencies or LTE high-band frequency while performing a carrier aggregation (CA) operation, if the transmission output is greater than a designated output and the 5G reception (RX) sensitivity is greater than a designated sensitivity, when the electronic device 101 changes the LTE main antenna from the first antenna 410 to the second antenna 420, the distance between the third antenna 430 and the second antenna 420 is relatively longer than the distance between the third antenna 430 and the first antenna 410, so that the isolation between the two antennas is increased, resulting in less harmonic signals and the 5G band frequency can be received without degradation.

Figure 5:
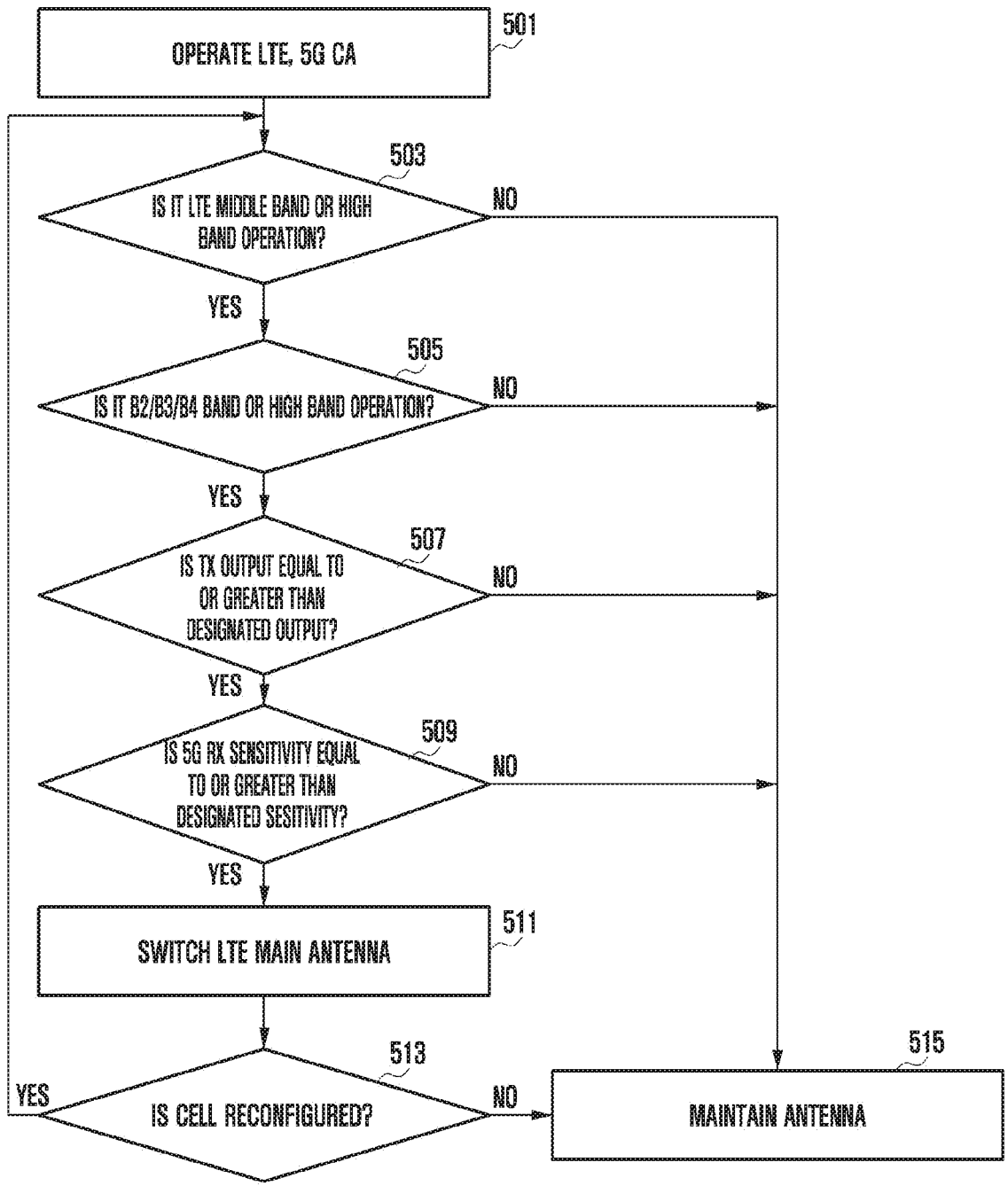
FIG. 5 is a view illustrating an antenna control operation of an electronic device according to an embodiment of the disclosure.

FIG. 5 is a view illustrating an antenna control operation of an electronic device 101 according to an embodiment of the disclosure.

In operation 501, the electronic device 101 may perform a carrier aggregation (CA) operation using an LTE band frequency and a 5G frequency, under the control of a processor (e.g., the processor 120 of FIG. 1A). For example, the carrier aggregation (CA) operation may be an operation that simultaneously uses the LTE band frequency and the 5G band frequency.

In operation 503, the electronic device 101 may determine whether the electronic device 101 operates on an LTE middle band frequency or an LTE high-band frequency under the control of the processor (e.g., the processor 120 of FIG. 1A). In operation 503, if the electronic device 101 is determined to operate on the LTE middle band frequency or the LTE high-band frequency under the control of the processor (e.g., the processor 120 of FIG. 1A), the operation may be branched to operation 505. In operation 503, the electronic device 101 may branch to operation 515 if it is not determined that the electronic device 101 operates on the LTE middle band frequency or the LTE high-band frequency under the control of the processor (processor 120 of FIG. 1A).

In operation 505, the electronic device 101 may determine whether to perform transmission (TX) operation using at least one of an LTE B2 band frequency, an LTE B3 band frequency and an LTE B4 band frequency among the LTE middle band frequencies or an LTE high-band frequency, under the control of the processor (e.g., the processor 120 of FIG. 1A). In operation 505, the electronic device 101 may branch to operation 507, under the control of the processor (e.g., the processor 120 of FIG. 1A), when it is determined that the electronic device 101 performs a transmission (TX) operation using at least one of the LTE B2 band frequency, the LTE B3 band frequency, and the LTE B4 band frequency among the LTE middle band frequencies, or the LTE high-band frequency. In operation 505, the electronic device 101 may branch to operation 515 under the control of the processor (e.g., the processor 120 of FIG. 1A), if it is determined that the electronic device 101 does not perform a transmission (TX) operation using at least one of the LTE B2 band frequency, the LTE B3 band frequency, and the LTE B4 band frequency among the LTE middle band frequencies, or the LTE high-band frequency.

In operation 507, the electronic device 101 may determine whether the transmission output is greater than or equal to a designated output under the control of a processor (e.g., the processor 120 of FIG. 1A), when the electronic device 101 performs a transmission (TX) operation using at least one of the LTE B2 band frequency, the LTE B3 band frequency, and the LTE B4 band frequency among LTE middle band frequencies, or the LTE high-band frequency. In operation 507, the electronic device 101 may branch to operation 509 under the control of a processor (e.g., the processor 120 of FIG. 1A), if it is determined that the transmission output is equal to or greater than the designated output, when the electronic device 101 performs a transmission (TX) operation using at least one of the LTE B2 band frequency, the LTE B3 band frequency, and the LTE B4 band frequency among LTE middle band frequencies, or the LTE high-band frequency. In operation 507, the electronic device 101 may branch to operation 515 under the control of a processor (e.g., the processor 120 of FIG. A), if it is determined that the transmission output is equal to or less than the designated output, when the electronic device 101 performs a transmission (TX) operation using at least one of the LTE B2 band frequency, the LTE B3 band frequency, and the LTE B4 band frequency among LTE middle band frequencies, or the LTE high-band frequency.

According to various embodiments of the disclosure, in operation 507, when assuming that the coupling factor (CF) of the coupler of the second front-end unit (e.g., the second front-end unit 232 of FIG. 2 or the second front-end unit 304 of FIG. 3) as 20 dB, if the transmission output coupled through the feedback reception output is equal to or greater than −20 dBm (e.g., a designated output), the electronic device 101 may branch to operation 509.

According to various embodiments of the disclosure, in operation 507, when assuming that the coupling factor (CF) of the coupler of the second front-end unit (e.g., the second front-end unit 232 of FIG. 2 or the second front-end unit 304 of FIG. 3) as 20 dB, if the transmission output coupled through the feedback reception output is equal to or less than −20 dBm (e.g., a designated output), the electronic device 101 may branch to operation 515.

In operation 509, the electronic device 101 may branch to operation 511 under the control of a processor (e.g., the processor 120 of FIG. 1A), if the transmission output is equal to or greater than a designated output and the 5G reception (RX) sensitivity is equal to or less than a designated sensitivity, when the electronic device 101 performs a transmission (TX) operation using at least one of the LTE B2 band frequency, the LTE B3 band frequency, and the LTE B4 band frequency among LTE middle band frequencies, or the LTE high-band frequency. In operation 509, the electronic device 101 may branch to operation 515 under the control of a processor (e.g., the processor 120 of FIG. 1A), if the transmission output is equal to or greater than a designated output and the 5G reception (RX) sensitivity is equal to or less than a designated sensitivity, when the electronic device 101 performs a transmission (TX) operation using at least one of the LTE B2 band frequency, the LTE B3 band frequency, and the LTE B4 band frequency among the LTE middle band frequencies, or the LTE high-band frequency. The designated sensitivity may, for example, be −90 dBm.

In operation 511, the electronic device 101 may switch the LTE main antenna under the control of a processor (e.g., the processor 120 of FIG. 1A), if the transmission output is equal to or greater than a designated output and the 5G reception (RX) sensitivity is equal to or greater than a designated sensitivity, when the electronic device 101 performs a transmission (TX) operation using at least one of the LTE B2 band frequency, the LTE B3 band frequency, and the LTE B4 band frequency among LTE middle band frequencies, or the LTE high-band frequency.

In operation 511, the electronic device 101 may change the LTE main antenna from the first antenna 261 of FIG. 2, the first antenna 391 of FIG. 3, or the first antenna 410 of FIG. 4 to the second antenna 262 of FIG. 2, the second antenna 392 of FIG. 3, or the second antenna 420 of FIG. 4 under the control of a processor (e.g., the processor 120 of FIG. 1A), if the transmission output is equal to or greater than a designated output and the 5G reception (RX) sensitivity is equal to or greater than a designated sensitivity, when the electronic device 101 performs a transmission (TX) operation using at least one of the LTE B2 band frequency, the LTE B3 band frequency, and the LTE B4 band frequency among LTE middle band frequencies, or the LTE high-band frequency. For example, the electronic device 101 may control the antenna switching module (e.g., the antenna switching module 346 of FIG. 3) included in the second front-end unit (e.g., the second front-end unit 232 of FIG. 2, and the second front-end unit 304 of FIG. 3) to switch the LTE main antenna from the first antenna 261 of FIG. 2, the first antenna 391 of FIG. 3, or the first antenna 410 of FIG. 4 to the second antenna 262 of FIG. 2, the second antenna 392 of FIG. 3, or the second antenna 420 of FIG. 4.

According to an embodiment, when branching from operation 503, operation 505, operation 507 and operation 509 to operation 515, the processor (e.g., the processor 120 of FIG. 1A) of the electronic device 101 may control the second front-end unit (e.g., the second front-end unit 232 of FIG. 2, and the second front-end unit 304 of FIG. 3) to maintain the LTE main antenna as the first antenna 261 of FIG. 2, the first antenna 391 of FIG. 3, or the first antenna 410 of FIG. 4.

In operation 513, the electronic device 101 may determine whether there is a communication cell reconfiguration operation under the control of the processor (e.g., the processor 120 of FIG. 1A). In operation 513, the electronic device 101 may branch to operation 503 under the control of the processor (e.g., the processor 120 of FIG. 1A) if there is a communication cell reconfiguration operation. In operation 513, the electronic device 101 may branch to operation 515 under the control of the processor (e.g., the processor 120 of FIG. 1A) if there is no communication cell reconfiguration operation. In operation 513, when branching to operation 515, the processor (e.g., the processor 120 of FIG. 1A) of the electronic device 101 may maintain the LTE main antenna as the second antenna 262 of FIG. 2, the second antenna 392 of FIG. 3, or the second antenna 420 of FIG. 4.

The electronic devices according to various embodiments disclosed in the document may be various types of devices. The electronic device may include, for example, at least one of a portable communication device (e.g., a smart phone), a computer device, a portable multimedia device, a portable medical device, a camera, a wearable device, or a home appliance. The electronic devices according to the embodiments are not limited to the above-described devices.

It should be understood that the various embodiments of the document and the terms used therein are not intended to limit the technology described in this document to specific embodiments, and include various modifications, equivalents, and/or replacements of the embodiments. In connection with the description of the drawings, similar reference numerals may be used for similar components. Singular expressions may include plural expressions unless the context clearly indicates otherwise. In this document, expressions such as "A or B", "at least one of A and/or B", "A, B or C" or "at least one of A, B and/or C", etc. can include all possible combinations listed together. Expressions such as "1st", "2nd", "first" or "second" can modify the corresponding components regardless of order or importance, and are used to distinguish one component from other components, but do not limit the components. When it is mentioned that one (e.g., first) component is "(functionally or communicatively) connected" or "coupled" to another (e.g., second) component, the one component may be directly connected to the other component, or be connected through other components (e.g., the third component).

As used herein, the term "module" may include units composed of hardware, software, or firmware, and may be used interchangeably with terms such as logic, logic blocks, components, or circuits. The module may be an integrally configured part or a minimum unit performing one or more functions or a part thereof. For example, the module may be configured with an application-specific integrated circuit (ASIC).

Various embodiments of this document may be implemented with software (e.g., program 140) including instructions stored in a storage medium (machine-readable storage media) (e.g., an internal memory 136 or an external memory 138) readable by a machine (e.g., a computer). The machine is a device capable of calling a stored instruction from a storage medium and operating according to the called instruction, and may include an electronic device (e.g., the electronic device 101) according to the disclosed embodiments. When the instruction is executed by a processor (e.g., the processor 120), the processor may perform a function corresponding to the instruction directly or by using other components under the control of the processor. The instructions may include codes generated or executed by a compiler or interpreter. The storage medium readable by the machine may be provided in the form of a non-transitory storage medium. Here, "non-transitory" means that the storage medium does not contain a signal and is tangible, but does not distinguish between data being permanently or temporarily stored in the storage medium.

According to an embodiment, a method according to various embodiments disclosed in this document may be provided as being included in a computer program product. The computer program products can be traded between sellers and buyers as a product. The computer program product may be distributed online in the form of a device-readable storage medium (e.g., compact disc read only memory (CD-ROM)) or through an application store (e.g., Play Store™). In the case of online distribution, at least a portion of the computer program product may be at least temporarily stored on a storage medium such as a memory of a manufacturer's server, an application store's server, or a relay server, or may be temporarily generated.

Each component (e.g., module or program) according to various embodiments may be composed of a singular or a plurality of entities, and some of the aforementioned sub-components may be omitted, or other sub-components may be further included in various embodiments. Alternatively or additionally, some components (e.g., modules or programs) may be integrated into one entity to perform the same or similar function performed by each corresponding component prior to integration. According to various embodiments, operations performed by a module, program, or other component may be sequentially, parallelly, repeatedly, or heuristically executed, or at least some operations may be executed in a different order or omitted, or other operations may be added.

The invention claimed is:

1. An electronic device comprising:
a processor;
a transceiver connected to the processor;
a first front-end unit connected to the transceiver and performing transmission/reception on an LTE low band frequency;
a second front-end unit connected to the transceiver and performing transmission/reception on at least one of an LTE middle band frequency and an LTE high-band frequency;
a third front-end unit connected to the transceiver and performing transmission/reception on a 5G band frequency;
a diplexer unit connected to the first front-end unit and the second front-end unit;
a filter unit connected to the second front-end unit;
a first antenna connected to the diplexer unit;
a second antenna connected to the filter unit; and
a third antenna connected to the third front-end unit.

2. The electronic device of claim 1, wherein the filter unit is a low-pass filter, and
wherein a cut off band frequency is a second harmonic frequency of one of the LTE middle band frequency or the LTE high-band frequency.

3. The electronic device of claim 1, wherein the second front-end unit further comprises an antenna switching module configured to configure a signal transmission/reception path through the first antenna or the second antenna, under the control of the processor.

4. The electronic device of claim 3, wherein the processor controls the antenna switching module so that the second front-end unit transmits/receives a signal through the filter unit when simultaneously using the 5G band frequency and at least one of the LTE middle band frequency and the LTE high band frequency.

5. The electronic device of claim 4, wherein the processor controls the antenna switching module so that the second front-end unit transmits/receives signals through the filter unit and the second antenna, if transmission output is greater than a designated sensitivity, in case that the electronic device communicates by simultaneously using the 5G band frequency and at least one of the LTE middle band frequency or the LTE high band frequency, when performing a transmission (TX) operation using at least one frequency among LTE middle band frequencies or the LTE high band frequency.

6. The electronic device of claim 4, wherein the transceiver transmits/receives signals through the first antenna, if it is determined that the electronic device does not operate in the LTE middle band frequency or the LTE high band frequency.

7. The electronic device of claim 4, wherein the transceiver transmits/receives signals through the first antenna, if it is determined that the transmission (TX) operation is not performed using at least one frequency in the LTE middle band frequency or the LTE high band frequency, in case that the electronic device communicates by simultaneously using the 5G band frequency, and at least one of the LTE middle band frequency or the LTE high band frequency.

8. The electronic device of claim 4, wherein the transceiver transmits/receives signals through the first antenna, if it is determined that the transmission output is equal to or less than a designated output, when performing a transmission (TX) operation using at least one frequency among LTE middle band frequencies or the LTE high band frequency, in case that the electronic device communicates by simultaneously using the 5G band frequency, and at least one of the LTE middle band frequency or the LTE high band frequency.

9. The electronic device of claim 4, wherein the transceiver transmits/receives signals through the first antenna, if it is determined that the transmission output is equal to or greater than a designated output and the reception sensitivity is equal to or less than a designated sensitivity, when performing a transmission (TX) operation using at least one frequency among LTE middle band frequencies or the LTE high band frequency, in case that the electronic device communicates by simultaneously using the 5G band frequency, and at least one of the LTE middle band frequency or the LTE high band frequency.

10. An antenna control method of an electronic device, the method comprising:
   communicating, by the electronic device, simultaneously using a 5G band frequency, and at least one of an LTE middle band frequency or an LTE high band frequency;
   determining whether the electronic device performs a transmission operation using the LTE middle band frequency or the LTE high band frequency;
   determining whether the electronic device performs a transmission (TX) operation using at least one band frequency of an LTE B2 band frequency, an LTE B3 band frequency and an LTE B4 band frequency, or the LTE high band frequency, when the electronic device performs a transmission operation using the LTE middle band frequency;
   determining whether a transmission output of the LTE middle band frequency or the LTE high band frequency is equal to or greater than a designated output, when it is determined that the electronic device performs a transmission operation using at least one band frequency of an LTE B2 band frequency, an LTE B3 band frequency and an LTE B4 band, or the LTE high band frequency;
   determining whether a reception sensitivity of the 5G band frequency is equal to or greater than a designated sensitivity, when a transmission output of the LTE middle band frequency or the LTE high band frequency is equal to or greater than a designated output; and
   controlling to transmit/receive a signal through an antenna connected to a filter unit, if the reception sensitivity of the 5G band frequency is equal to or greater than a designated sensitivity.

11. The method of claim 10, wherein the filter unit is a low pass filter, and wherein a cutoff band frequency is a second harmonic frequency of the LTE middle band frequency or a second harmonic frequency of the LTE high band frequency.

12. The method of claim 11, wherein the LTE middle band frequency or the LTE high band frequency transmits/receives a signal through a first antenna or a second antenna, wherein the 5G band frequency transmits receives a signal through a third antenna, and wherein the antenna connected to the filter unit is the second antenna.

13. The method of claim 12, further comprising controlling to transmit/receive a signal through the first antenna, if it is determined that the electronic device does not operate in the LTE middle band frequency or the LTE high band frequency.

14. The method of claim 12, further comprising controlling to transmit/receive a signal through the first antenna, if it is determined that the electronic device does not operate a transmission (TX) operation using at least one band frequency of an LTE B2 band frequency, an LTE B3 band frequency and an LTE B4 band frequency, or the LTE high band frequency.

15. The method of claim 12, further comprising at least one of:
   controlling to transmit/receive a signal through the first antenna, if it is determined that the transmission output is equal to or less than the designated output; and
   controlling to transmit/receive a signal through the first antenna, if it is determined that the reception sensitivity is equal to or less than the designated sensitivity.

* * * * *